March 31, 1953 K. F. EWESON 2,633,412
APPARATUS FOR MAKING ORGANIC FERTILIZER
Filed March 2, 1951 3 Sheets-Sheet 1

INVENTOR
Karl Folke Eweson
BY
ATTORNEY

March 31, 1953  K. F. EWESON  2,633,412
APPARATUS FOR MAKING ORGANIC FERTILIZER
Filed March 2, 1951  3 Sheets-Sheet 3

INVENTOR
Karl Folke Eweson
BY
Emery, Varney, Whittemore & Dix
ATTORNEY

Patented Mar. 31, 1953

2,633,412

UNITED STATES PATENT OFFICE 2,633,412

APPARATUS FOR MAKING ORGANIC FERTILIZER

Karl Folke Eweson, New York, N. Y.

Application March 2, 1951, Serial No. 213,521

6 Claims. (Cl. 23—259.1)

This invention relates to apparatus for making organic fertilizer from organic waste materials.

In a prior Patent No. 2,474,833, issued to Eric W. Eweson on July 5, 1949, a process for making organic fertilizer is described in which organic waste materials such as garbage, sludge, manure and other refuse and waste materials are placed in a tank in which the propagation of aerobic bacteria is promoted by the controlled supply of air to the mass of material being treated and the controlled withdrawal of spent air and generated gases from the mass at vertically spaced intervals.

In the practice of the process, it has been found to be desirable to support the material at vertically spaced intervals, so that open spaces may be formed beneath each support to permit the controlled withdrawal of spent air and generated gases at vertically spaced intervals. Such supports cannot be in the form of solid decks as proposed in some prior processes, for such decks would prevent the movement of air through the mass of the material as required for the efficient operation of the Eweson process. Accordingly, grids consisting of spaced supporting elements have been used, the nature of the material being such that it bridges across the spaces between said supporting elements to sustain the load above, but without preventing flow of air upward through the material.

When it is desired to move the material from one level to the next lower level, however, it is necessary to break up said bridges so that the material may drop through the grids. This has been done by agitating the material with rotating arms, but the nature of the material is such that this has posed mechanical problems which have been difficult and expensive to solve.

It is an object of the present invention to provide a novel type of supporting grid consisting of flexible supporting members which may be stretched taut to support the material, but which may be slacked to break the bridging material, so as to permit the material to drop to a lower level.

Other objects and advantages of the invention will appear hereinafter.

A preferred embodiment of the invention selected for purposes of illustration is shown in the accompanying drawings, in which.

Figure 1:
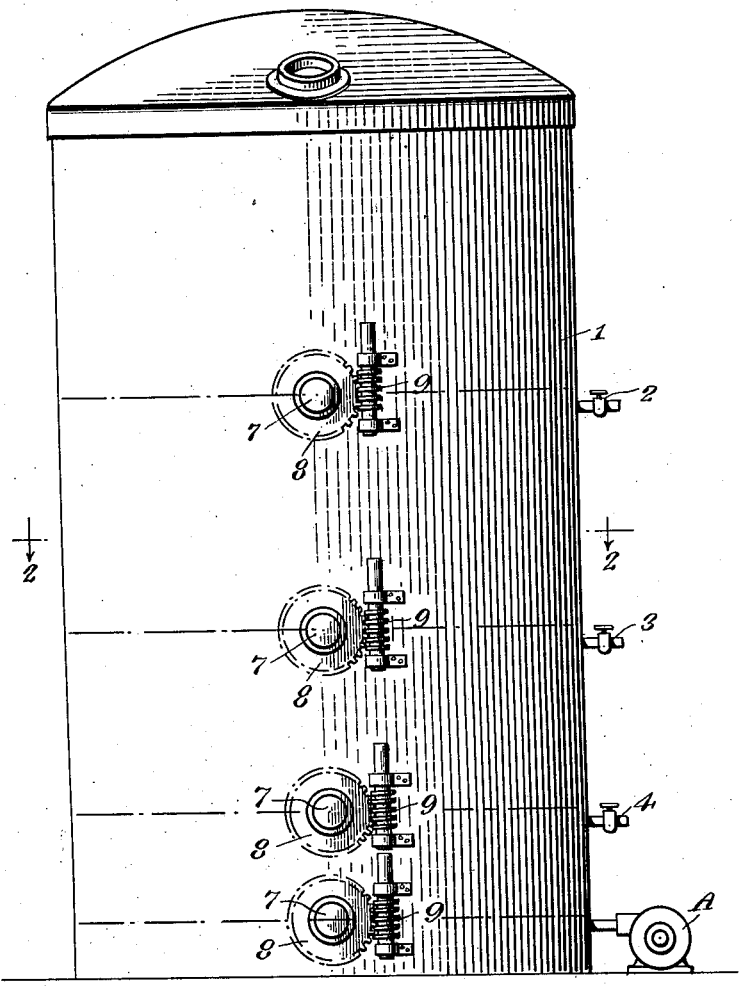
Figure 1 is a front elevation of an apparatus embodying the invention.
Figure 2:
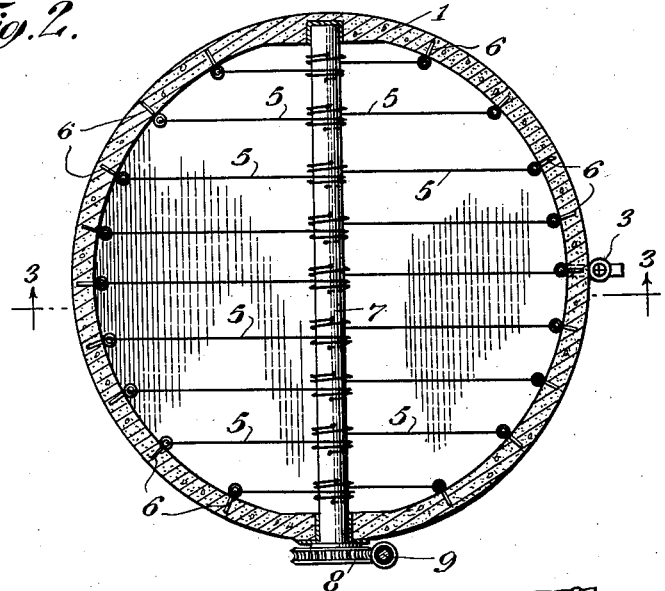
Figure 2 is a horizontal section on the line 2—2 of Figure 1.
Figure 3:
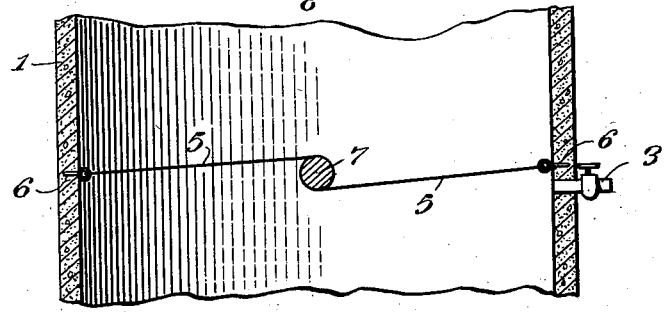
Figure 3 is a fragmentary vertical section on the line 3—3 of Figure 2.
Figure 4:
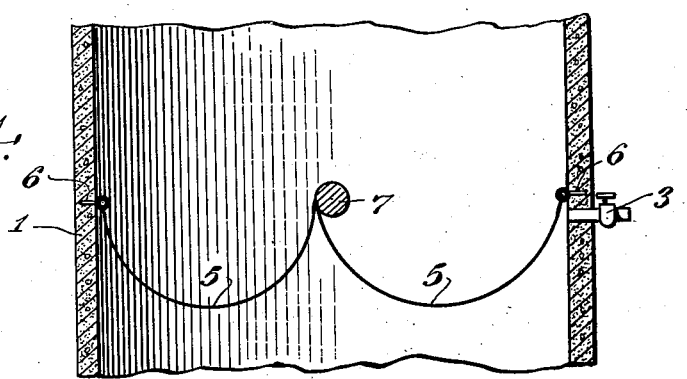
Figure 4 is similar to Figure 3 showing the strands of the grid in slack position.

Referring to the drawings, the invention is illustrated in Figures 1, 2 and 3 as applied to a cylindrical tank 1 which may be supported in any suitable manner to stand on a vertical axis. In the tank shown, three valve controlled vent pipes 2, 3 and 4 are provided for the withdrawal of spent air and generated gases, thus requiring three of the supporting grids hereinafter described. Any suitable means may be used to introduce controlled quantities of fresh air at the bottom of the tank.

Each of the supporting grids comprises a plurality of flexible strands 5, preferably of wire rope, although chain may be used, if desired. One end of each strand is anchored to the wall of the tank in any suitable manner as by an eye 6 and the other end is secured to a shaft 7 extending diametrically across the tank and rotatably journalled in the walls thereof. The respective ends of the corresponding, opposed strands which extend to the shaft from opposite sections of the wall are wrapped around the shaft in opposite directions, so that if said shaft is rotated in one direction, for example, in clockwise direction as seen in Figure 3, all of the strands will be stretched taut, while if the shaft is rotated in the opposite direction, all of the strands will be slacked.

The strands are arranged so that adjacent, parallel strands are spaced at intervals sufficiently close to support the material when the strands are stretched taut. The spacing may vary from the top to the bottom of the tank, as the raw material as originally introduced at the top of the tank is much more cohesive and capable of bridging a wider interval than the treated material at lower levels of the tank. Thus, for the top grid, a spacing of about 12" between adjacent strands may be permissible, while for the bottom grid a spacing of 3" to 6" is required.

It will be obvious, of course, that when the strands are slacked, they sag under the weight of the material, and the bridges collapse, allowing the supported material to drop through. Thereafter, the strands may be stretched taut again ready to receive and support additional material from above.

The shafts 7 may be rotated in any suitable manner, as for example by the worm gear 8 and worm 9. The worm 9 may be operated either by power or by hand.

Figure 5:
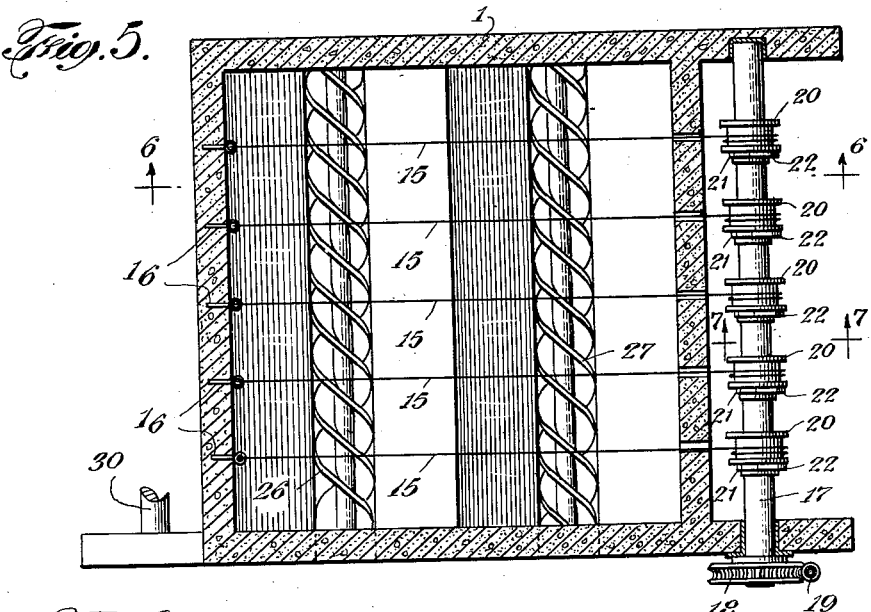
Figure 5 is a horizontal section through a modified form of apparatus.
Figure 6:
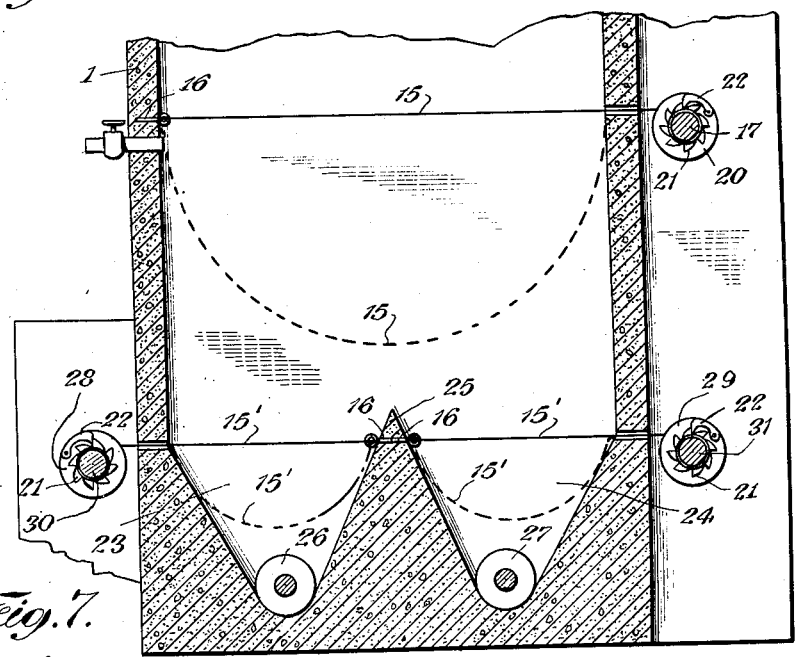
Figure 6 is a vertical section on the line 6—6 of Figure 5.
Figure 7:
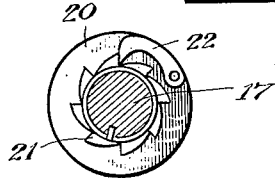
Figure 7 is an enlarged section on the line 7—7 of Figure 5.

In Figures 5, 6 and 7, a modification of the invention adapted for use in a square or rectangular tank is shown. With a square or rectangular tank, it is possible to mount the operating shafts 17 outside the tank, with the attendant advantages of eliminating the possibility of the shaft obstructing the fall of any of the material and of eliminating the possibility of material becoming wedged between the strands and shafts as the strands are pulled taut.

With a square or rectangular tank, it is also possible to mount each strand so that it may be manipulated separately as well as collectively, with the other strands. Thus one end of each strand 15 is anchored to one wall by an eye 16, extends through the opposite wall and is secured to a reel 20 journalled on the shaft 17. If desired, the openings through the wall may be suitably packed to avoid leakage. A ratchet 21 is mounted on the shaft adjacent the reel for engagement by a pawl 22 pivoted on the reel. Thus, any of the strands 15 may be slacked at any time by raising the pawl 22. On the other hand, the shaft 17 may be rotated to tighten or slacken the strands collectively by means of the worm gear 18 and worm 19.

The square or rectangular shape of tank also lends itsef readily to the discharge of finished material by screw conveyor as shown in Figures 5 and 6. In this form the bottom of the tank is provided with two V-shaped troughs 23, 24 separated by a partition 25 with screw conveyors 26, 27 in the bottom of the troughs. In order to prevent interference with the strands 15' of the bottom grid by the partition 25, the strands of this grid are divided with their inner ends anchored on the partition and their outer ends secured to reels 28, 29 mounted on separate shafts 30, 31. As previously described, the strands may be manipulated individually or collectively.

In operation, whenever the flexible strands are pulled taut, a relatively firm grid is provided which is adequate to support the material without interfering with the free flow of air from one level to another. When it is desired to drop the material from one level to a lower level, the strands are slacked off, thus breaking the bridges of material and allowing it to fall through. In addition, in any case where large lumps of material may fall through without breaking, pulling the strands taut again tends to break up such lumps, making the material more fluffy and more easily penetrable. Sometimes, therefore, it is useful to tighten and slacken the strands several times in succession before finally tightening them to support material from above.

It will be understood that the invention may be variously modified and embodied within the scope of the subjoined claims.

I claim as my invention:

1. Apparatus for making organic fertilizer, comprising, a tank, a grid extending across the interior of said tank, said grid comprising a plurality of spaced, parallel, flexible strands, each of said strands having one end anchored to the tank wall and another end secured to a member mounted for movement relative to the tank wall, and means for adjusting the position of said movable member to slacken said strands and to stretch them taut.

2. Apparatus as claimed in claim 1 in which said movable member is a rotatable shaft.

3. Apparatus as claimed in claim 1 in which said movable member is a rotatable shaft extending diametrically across the interior of said tank.

4. Apparatus as claimed in claim 1 in which said movable member is a rotatable shaft extending diametrically across the interior of said tank, and in which strands extending to said shaft from opposite sides of said tank are wrapped around said shaft in opposite directions.

5. Apparatus as claimed in claim 1 in which said tank is square or rectangular and in which said movable member is a rotatable shaft extending parallel to one wall of the tank exteriorly thereof.

6. Apparatus as claimed in claim 1 in which said movable member comprises a reel and a rotatable shaft, said reel being journalled on said shaft.

KARL FOLKE EWESON.

REFERENCES CITED

The following references are of record in the file of this patent:

UNITED STATES PATENTS

| Number | Name | Date |
| --- | --- | --- |
| 679,604 | Cook | July 30, 1901 |
| 1,082,303 | Carr | Dec. 23, 1913 |
| 1,407,965 | Ware | Feb. 22, 1922 |
| 2,178,818 | Earp-Thomas | Nov. 7, 1939 |
| 2,474,833 | Eweson | July 5, 1949 |